(12) United States Patent
Slater (10) Patent No.: US 7,165,049 B2
(45) Date of Patent: Jan. 16, 2007

(54) SPONSOR FUNDED STORED VALUE CARD

(75) Inventor: Kim Michele Slater, Detroit, MI (US)

(73) Assignee: JPMorgan Chase Bank, N.A., New York, NY (US)

( * ) Notice: Subject to any disclaimer, the term of this patent is extended or adjusted under 35 U.S.C. 154(b) by 222 days.

(21) Appl. No.: 10/284,395

(22) Filed: Oct. 31, 2002

(65) Prior Publication Data

US 2003/0055782 A1   Mar. 20, 2003

Related U.S. Application Data (63) Continuation of application No. 09/500,690, filed on Feb. 9, 2000, now Pat. No. 6,615,190.

(51) Int. Cl.
   *G06F 17/60* (2006.01)
(52) U.S. Cl. .............................. 705/41; 705/39; 705/40
(58) Field of Classification Search .................. 705/39, 705/40, 41
   See application file for complete search history.

(56) References Cited

U.S. PATENT DOCUMENTS

| | | | |
|---|---|---|---|
| 3,634,669 A | 1/1972 | Spontak |
| 3,946,206 A | 3/1976 | Darjany |
| 4,047,033 A | 9/1977 | Maimberg |
| 4,465,206 A | 8/1984 | Sorel et al. |
| 4,545,838 A | 10/1985 | Minkus |
| 4,582,985 A | 4/1986 | Lofberg |
| 4,614,861 A | 9/1986 | Pavlov et al. |
| 4,634,845 A | 1/1987 | Riley |
| 4,689,478 A | 8/1987 | Hale et al. |
| 4,700,055 A | 10/1987 | Kashkashian, Jr. |
| 4,746,787 A | 5/1988 | Suto et al. |
| 4,750,119 A | 6/1988 | Robertson |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs et al. |

(Continued)

FOREIGN PATENT DOCUMENTS

CA   2293321   12/1998

(Continued)

OTHER PUBLICATIONS

Coulton A., DR-Link, Incentive Field Moving to Card-Based Award Series, Mar. 26, 1998, 3 pgs.*

(Continued)

*Primary Examiner*—Charles R. Kyle
(74) *Attorney, Agent, or Firm*—Hunton & Williams LLP (57) ABSTRACT

A method and system for issuing a sponsor funded stored value card. A sponsor company funds an account associated with the stored value card. The stored value card is issued to a cardholder, who can withdraw funds from the account, but cannot deposit additional funds in the account. A sponsor funded stored value card may reduce expenses and difficulties associated with written checks.

40 Claims, 2 Drawing Sheets

U.S. PATENT DOCUMENTS

| | | |
|---|---|---|
| 4,868,376 A | 9/1989 | Lessin et al. |
| 4,870,259 A | 9/1989 | Boggan et al. |
| 4,882,675 A | 11/1989 | Nichtberger |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliot et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,175,416 A | 12/1992 | Mansvelt |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,803 A | 4/1993 | Vitagliano |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe |
| 5,349,633 A | 9/1994 | Katz |
| 5,350,906 A | 9/1994 | Brody et al. |
| 5,359,183 A | 10/1994 | Skodlar |
| 5,365,575 A | 11/1994 | Katz |
| 5,383,113 A | 1/1995 | Kight et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert |
| 5,450,477 A | 9/1995 | Amarant |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt |
| 5,466,919 A | 11/1995 | Hovakimian |
| 5,471,669 A | 11/1995 | Lidman |
| 5,477,038 A | 12/1995 | Levine |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark |
| 5,483,445 A | 1/1996 | Pickering |
| 5,500,514 A | 3/1996 | Veeneman |
| 5,511,114 A | 4/1996 | Stimson |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stekfik |
| 5,537,314 A | 7/1996 | Kanter |
| 5,544,086 A | 8/1996 | Davis |
| 5,544,246 A | 8/1996 | Mandelbaum |
| 5,553,120 A | 9/1996 | Katz |
| 5,572,676 A | 11/1996 | Ohnishi |
| 5,577,109 A | 11/1996 | Stimson |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off et al. |
| 5,621,787 A | 4/1997 | McKoy |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Bloomberg et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,664,110 A | 9/1997 | Green |
| 5,664,157 A | 9/1997 | Takahira et al. |
| 5,665,953 A | 9/1997 | Mazzamuto et al. |
| 5,675,607 A | 10/1997 | Alesio |
| 5,675,662 A | 10/1997 | Deaton et al. |
| 5,677,955 A | 10/1997 | Doggett |
| 5,684,291 A | 11/1997 | Taskett |
| 5,687,322 A | 11/1997 | Deaton et al. |
| 5,689,100 A | 11/1997 | Carrithers |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy |
| 5,704,046 A | 12/1997 | Hogan |
| 5,705,798 A | 1/1998 | Tarbox |
| 5,708,422 A | 1/1998 | Blonder |
| 5,710,458 A | 1/1998 | Iwasaki |
| 5,710,886 A | 1/1998 | Christensen |
| 5,710,887 A | 1/1998 | Chelliah et al. |
| 5,710,889 A | 1/1998 | Clark et al. |
| 5,715,399 A | 2/1998 | Bezos |
| 5,721,768 A | 2/1998 | Stimson |
| 5,721,781 A | 2/1998 | Deo et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson et al. |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,706 A | 4/1998 | Wolfberg et al. |
| 5,749,075 A | 5/1998 | Toader et al. |
| 5,760,381 A | 6/1998 | Stich |
| 5,765,141 A | 6/1998 | Spector |
| 5,770,843 A | 6/1998 | Rose |
| 5,770,849 A | 6/1998 | Novis et al. |
| 5,774,870 A | 6/1998 | Storey |
| 5,777,305 A | 7/1998 | Smith |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holman |
| 5,789,733 A | 8/1998 | Jachimowicz et al. |
| 5,794,207 A | 8/1998 | Walker et al. |

| Patent | Date | Name | | Patent | Date | Name |
|---|---|---|---|---|---|---|
| 5,799,087 A | 8/1998 | Rosen | | 6,004,681 A | 12/1999 | Epstein et al. |
| 5,802,176 A | 9/1998 | Audebert | | 6,006,988 A | 12/1999 | Behrmann et al. |
| 5,805,719 A | 9/1998 | Pare, Jr. et al. | | 6,009,415 A | 12/1999 | Shurling et al. |
| 5,806,042 A | 9/1998 | Kelly et al. | | 6,014,636 A | 1/2000 | Reeder |
| 5,806,044 A | 9/1998 | Powell | | 6,014,638 A | 1/2000 | Burge et al. |
| 5,806,045 A | 9/1998 | Biorge et al. | | 6,014,645 A | 1/2000 | Cunningham |
| 5,807,627 A | 9/1998 | Friend et al. | | 6,014,749 A * | 1/2000 | Gloor et al. ............... 713/300 |
| 5,809,478 A | 9/1998 | Greco et al. | | 6,016,482 A | 1/2000 | Molinari et al. |
| 5,815,657 A | 9/1998 | Williams et al. | | 6,016,954 A | 1/2000 | Abe |
| 5,815,658 A | 9/1998 | Kuriyama | | 6,019,284 A | 2/2000 | Freeman et al. |
| 5,819,234 A | 10/1998 | Slavin et al. | | 6,026,370 A | 2/2000 | Jermyn |
| 5,819,237 A | 10/1998 | Garman | | 6,029,139 A | 2/2000 | Cunningham et al. |
| 5,832,457 A | 11/1998 | O'Brien | | 6,029,890 A | 2/2000 | Austin |
| 5,835,061 A | 11/1998 | Stewart | | 6,032,136 A | 2/2000 | Brake, Jr. et al. |
| 5,835,576 A | 11/1998 | Katz | | 6,036,099 A | 3/2000 | Leighton |
| 5,839,113 A | 11/1998 | Federau et al. | | 6,038,292 A | 3/2000 | Thomas |
| 5,845,259 A | 12/1998 | West | | 6,038,552 A | 3/2000 | Fleischl |
| 5,845,260 A | 12/1998 | Nakano et al. | | 6,041,315 A | 3/2000 | Pollin |
| 5,852,811 A | 12/1998 | Atkins | | 6,045,042 A | 4/2000 | Ohno |
| 5,852,812 A | 12/1998 | Reeder | | 6,047,067 A | 4/2000 | Rosen |
| 5,857,079 A | 1/1999 | Claus | | 6,049,463 A | 4/2000 | O'Malley et al. |
| 5,857,175 A | 1/1999 | Day et al. | | 6,049,773 A | 4/2000 | McCormack et al. |
| 5,857,709 A | 1/1999 | Chock | | 6,049,782 A | 4/2000 | Gottesman et al. |
| 5,859,419 A | 1/1999 | Wynn | | 6,058,378 A | 5/2000 | Clark et al. |
| 5,864,609 A | 1/1999 | Cross | | 6,064,985 A | 5/2000 | Anderson |
| 5,864,828 A | 1/1999 | Atkins | | 6,065,675 A | 5/2000 | Teicher |
| 5,864,830 A * | 1/1999 | Armetta et al. ............... 705/41 | | 6,068,183 A | 5/2000 | Freeman et al. |
| 5,870,718 A | 2/1999 | Spector | | 6,070,147 A | 5/2000 | Harms et al. |
| 5,870,721 A | 2/1999 | Norris | | 6,070,153 A | 5/2000 | Simpson |
| 5,875,437 A | 2/1999 | Atkins | | 6,076,068 A | 6/2000 | DeLapa et al. |
| 5,883,377 A | 3/1999 | Chapin, Jr. | | 6,076,072 A | 6/2000 | Libman |
| 5,883,810 A | 3/1999 | Franklin | | 6,078,888 A | 6/2000 | Johnson, Jr. |
| 5,884,271 A | 3/1999 | Pitroda | | 6,078,891 A | 6/2000 | Riordan et al. |
| 5,884,278 A | 3/1999 | Powell | | 6,091,817 A | 7/2000 | Bertina et al. |
| 5,884,285 A | 3/1999 | Atkins | | 6,092,056 A | 7/2000 | Tull, Jr. et al. |
| 5,887,065 A | 3/1999 | Audebert | | 6,095,412 A | 8/2000 | Bertina et al. |
| 5,890,138 A | 3/1999 | Godin et al. | | 6,095,416 A | 8/2000 | Grant et al. |
| 5,890,140 A | 3/1999 | Clark et al. | | 6,098,053 A | 8/2000 | Slater |
| H1794 H * | 4/1999 | Claus .................. 235/380 | | 6,105,011 A | 8/2000 | Morrison, Jr. |
| 5,897,620 A | 4/1999 | Walker et al. | | 6,105,865 A | 8/2000 | Hardesty |
| 5,905,246 A | 5/1999 | Fajkowski | | 6,115,458 A | 9/2000 | Taskett |
| 5,911,135 A | 6/1999 | Atkins | | 6,119,932 A | 9/2000 | Maloney et al. |
| 5,911,136 A | 6/1999 | Atkins | | 6,122,623 A | 9/2000 | Garman |
| 5,920,629 A | 7/1999 | Rosen | | 6,128,598 A | 10/2000 | Walker et al. |
| 5,920,844 A | 7/1999 | Hotta et al. | | 6,128,599 A | 10/2000 | Walker et al. |
| 5,920,847 A | 7/1999 | Kolling et al. | | 6,129,274 A | 10/2000 | Suzuki |
| 5,923,734 A | 7/1999 | Taskett | | 6,134,536 A | 10/2000 | Shepherd |
| 5,926,800 A | 7/1999 | Baronowski | | 6,138,917 A | 10/2000 | Chapin, Jr. |
| 5,930,217 A | 7/1999 | Kayanuma | | 6,145,741 A | 11/2000 | Wisdom et al. |
| 5,931,764 A | 8/1999 | Freeman et al. | | 6,148,297 A | 11/2000 | Swor et al. |
| 5,933,817 A | 8/1999 | Hucal | | 6,161,096 A | 12/2000 | Bell |
| 5,937,068 A | 8/1999 | Aubebert | | 6,163,770 A | 12/2000 | Gamble et al. |
| 5,940,811 A | 8/1999 | Norris | | 6,164,533 A | 12/2000 | Barton |
| 5,952,641 A | 9/1999 | Korshun | | 6,167,385 A | 12/2000 | Hartley-Urquhart |
| 5,953,423 A | 9/1999 | Rosen | | 6,169,975 B1 | 1/2001 | White et al. |
| 5,953,710 A * | 9/1999 | Fleming .................. 705/38 | | 6,173,267 B1 | 1/2001 | Cairns |
| 5,955,961 A | 9/1999 | Wallerstein | | 6,182,048 B1 | 1/2001 | Osborn et al. |
| 5,963,648 A | 10/1999 | Rosen | | 6,182,894 B1 | 2/2001 | Hackett et al. |
| 5,970,479 A | 10/1999 | Shepherd | | 6,186,793 B1 | 2/2001 | Brubaker |
| 5,970,480 A | 10/1999 | Kalina | | 6,189,787 B1 | 2/2001 | Dorf |
| 5,974,399 A | 10/1999 | Giuliani et al. | | 6,195,644 B1 | 2/2001 | Bowie |
| RE36,365 E | 11/1999 | Levine et al. | | 6,202,053 B1 | 3/2001 | Christiansen et al. |
| 5,984,180 A | 11/1999 | Albrecht | | RE37,122 E | 4/2001 | Levine et al. |
| 5,984,191 A | 11/1999 | Chapin, Jr. | | 6,227,447 B1 | 5/2001 | Campisano |
| 5,987,434 A | 11/1999 | Libman | | 6,243,688 B1 | 6/2001 | Kalina |
| 5,988,509 A | 11/1999 | Taskett | | 6,263,316 B1 | 7/2001 | Khan et al. |
| 5,991,413 A | 11/1999 | Arditti et al. | | 6,265,977 B1 | 7/2001 | Vega et al. |
| 5,991,748 A | 11/1999 | Taskett | | 6,278,981 B1 | 8/2001 | Dembo et al. |
| 5,991,750 A | 11/1999 | Watson | | 6,295,522 B1 * | 9/2001 | Boesch .................. 705/41 |
| 6,000,608 A | 12/1999 | Dorf | | 6,298,336 B1 | 10/2001 | Davis et al. |
| 6,002,832 A | 12/1999 | Franklin et al. | | 6,308,268 B1 | 10/2001 | Audebert |
| 6,002,383 A | 12/1999 | Shimada | | 6,336,099 B1 | 1/2002 | Barnett et al. |
| 6,003,762 A | 12/1999 | Hayashida | | 6,341,724 B1 | 1/2002 | Campisano |

| | | |
|---|---|---|
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,385,591 B1 | 5/2002 | Mankoff |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B1 | 10/2002 | Fite et al. |
| 6,473,500 B1 | 10/2002 | Risafi et al. |
| 6,484,144 B1 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,560,578 B1 | 5/2003 | Eldering |
| 6,574,603 B1 | 6/2003 | Dickson et al. |
| 6,581,839 B1 | 6/2003 | Lasch et al. |
| 6,601,761 B1 | 8/2003 | Katis |
| 6,609,111 B1 | 8/2003 | Bell |
| RE38,255 E | 9/2003 | Levine et al. |
| 6,615,189 B1* | 9/2003 | Phillips et al. ................ 705/41 |
| 6,615,190 B1* | 9/2003 | Slater ........................ 705/41 |
| 6,625,582 B1 | 9/2003 | Richman et al. |
| 6,631,849 B1 | 10/2003 | Blossom |
| 6,641,049 B1 | 11/2003 | Luu |
| 6,641,050 B1 | 11/2003 | Kelley et al. |
| 6,675,127 B1 | 1/2004 | LaBlanc et al. |
| 6,693,544 B1 | 2/2004 | Hebbecker |
| 6,745,938 B1 | 6/2004 | Sullivan |
| 6,802,008 B1 | 10/2004 | Ikefuji et al. |
| 6,805,287 B1 | 10/2004 | Bishop |
| 6,865,547 B1 | 3/2005 | Brake, Jr. et al. |
| 6,868,426 B1 | 3/2005 | Mankoff |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1* | 2/2002 | Koppel et al. ................ 705/41 |
| 2002/0046255 A1 | 4/2002 | Moore et al. |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0120627 A1 | 8/2002 | Mankoff |
| 2002/0143703 A1 | 10/2002 | Razvan |
| 2002/0147662 A1 | 10/2002 | Anderson |
| 2002/0165820 A1 | 11/2002 | Anvekar et al. |
| 2002/0174016 A1 | 11/2002 | Cuervo |
| 2003/0004828 A1 | 1/2003 | Epstein |
| 2003/0023549 A1 | 1/2003 | Armes et al. |
| 2003/0028518 A1 | 2/2003 | Mankoff |
| 2003/0046249 A1 | 3/2003 | Wu |
| 2003/0053609 A1 | 3/2003 | Risafi et al. |
| 2003/0101119 A1 | 5/2003 | Persons et al. |
| 2003/0105672 A1 | 6/2003 | Epstein et al. |
| 2003/0135462 A1 | 7/2003 | Brake Jr. et al. |
| 2003/0140004 A1 | 7/2003 | O'Leary et al. |
| 2003/0144935 A1 | 7/2003 | Sobek |
| 2003/0163403 A1 | 8/2003 | Chen et al. |
| 2003/0172040 A1 | 9/2003 | Kemper et al. |
| 2003/0195808 A1 | 10/2003 | Brown et al. |
| 2003/0200180 A1 | 10/2003 | Phelan et al. |
| 2003/0216965 A1 | 11/2003 | Libman |
| 2004/0024672 A1 | 2/2004 | Brake Jr. et al. |
| 2004/0030626 A1 | 2/2004 | Libman |
| 2004/0039588 A1 | 2/2004 | Libman |
| 2004/0039694 A1* | 2/2004 | Dunn et al. ................... 705/39 |
| 2004/0098351 A1 | 5/2004 | Duke |
| 2004/0243498 A1 | 12/2004 | Duke |
| 2005/0027649 A1 | 2/2005 | Cech |
| 2005/0071230 A1 | 3/2005 | Mankoff |
| 2005/0075932 A1 | 4/2005 | Mankoff |
| 2005/0171898 A1* | 8/2005 | Bishop et al. ................ 705/39 |

FOREIGN PATENT DOCUMENTS

| | | |
|---|---|---|
| EP | 959440 | 11/1999 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 99/05633 | 2/1999 |
| WO | WO 01/69347 | 9/2001 |
| WO | WO 2005/043277 A2 | 5/2005 |

OTHER PUBLICATIONS

Incentive Firms Find Debiut Crads a Rewarding Experience, Debit Card News v3 n 11, 3 pgs Nov. 28, 1997.*

The Campus Card Conundrum, Card Technology, Feb. 1998, 8 pages.*

CardEx Incentives, Apr. 6, 1999, www.cardexco.com.

"Associates First Capital Corporation", Hoover's Inc., The Industry Standard: The Newsmagazine of the Internet Economy, thestandard.net/companies/cpmpany-display, Apr. 6, 1999.

Jeffrey M. Lacker, "Stored Value Cards: Costly Private Substitutions for Government Currency", Economic Quarterly, 1996.

"The Evolution of a New Consumerism", Chain Store Age, vol. 73, pp. 8-9, Jun. 1997.

Lisa Fickenscher, "Amex prepaid offering is latest card for firms regarding employees", American Banker, vol. 161, No. 151, p. 11, Aug. 8, 1996.

"Welcome to Swiftgift", Swiftgift, www.swiftgiftcard.com, Dec. 8, 1998.

Lucy Lzarony, "Stuck for a gift? Give a prepaid credit card", www.bankrate.com, Dec. 21, 1998.

Antoinette Coulton, "Incentives field moving to card-based series 14", American Banker, Mar. 26, 1998.

Credit Card News, "A store card issuer looks for lift from electronic gift certificates", Feb. 1, 1995.

Business Travel News, "Maritz gets mastercard's stamp of approval", Aug. 19, 1996.

Debit Card News, vol. 2, Issue 2, "Boatman's floats stored value into the employee incentive waters", Jul. 16, 1996.

Mickey Meece, "Boatman's prepaid cards for worker-incentive firm", American Banker, Jul. 2, 1996.

Card News, vol. 6, No. 25, "D.C. Area Safeway stores look for increase in sales volume and revenue with cards", Dec. 1991.

Spurgin, "Sopininmon! or What's happening in the retail credit card environment", Credit World Journal, Apr. 1997.

AT&T Marketing, "Universal card free lifetime membership extended 3 months", www.att.com/press/0297/970217.csa.html, Dec. 4, 1990.

Chain Store Age Executive with Shopping Center Age, "More retailers turn to co-branding", Feb. 1, 1995.

Introducing SpendingMoney(TM), Armetta: Marketing & Design Product Concept Report, Oct. 9, 1996.

First USA Platinum Connect, First USA Bank, First USA Promotional Mailing, Oct. 1997.
Introducing the First USA Platinum Connect Card, First USA Promotional Mailing, Dec. 1997.
Here's the calling convenience you asked for: 1-800-call-AT&T . . . For All Calls, Appendix A: For Card Carriers.
Beth Piskora, Debit Cards Seen Poised for New Markets, American Banker, pp. 16, Mar. 7, 1995.
Nick Rosen, Cash Just Isn't Flexible Enough: Shops of the Future Will Only Take Cards, Daily Express: Technology Section, Feb. 10, 1995.
Phil Britt, Competing in Auto Lending, America's Community Banker, vol. 5, No. 11, pp. 33-37, Nov. 1, 1996.
Miriam Krenin Souccar, Smart Cards: 1st Union Smart Card Pilot Enlists a Second Army Base, American Banker.
First Union Issues Smart Cards to Fort Benning Recruits, CardFax.
Emerson Brown and Jim Baum, Purchasing Card Magic: Eli Lilly Finds Accounts Payable Flying High With Plastic, Corporate Cashflow.
International Search Report for Application No. PCT/US01/03587 filed on Feb. 9, 2000 and dated Apr. 27, 2001.
International Preliminary Examination Report for Application No. PCT/USO1/03587 filed on Feb. 9, 2000 and dated Jul. 18, 2002.
Christine Dugas, Payroll May Ask: Paper or Plastic? , USA Today, 3B, Aug. 14, 2001.
Cards International Jan. 30, 1996, First Data markets stored-value cards, 2 pages.
Business Wire, Jan. 15, 1996, CES/NaBANCO introduces stored value card technology; blockbuster video is first merchant partner, 2 pages.
Melinda Norris, et al., Omaha World Herald, Jan. 19, 1996, Sunrise Edition, First data unit develops blockbuster cash card, 2 pages.
Valerie Block, The American Banker, Sep. 1, 1995, Blockbuster running test of a stored value card, 2 pages.
CardEx's IncentiveCards, as disclosed in the CardEx web site archived by web.archive.org on Feb. 7, 1998 [http://web.archive.org/web/*/http://www.cardex.com], retrieve Oct. 18, 2003.
CardEx web site archived by web.archive.org on Oct. 31, 1996 [http://web.archive.org/web/*/http://www.cardex.com], retrieve Oct. 18, 2003.
Song, Time Magazine Article, Monday, Apr. 12, 2004, "A card that asks for ID", 1 page.
Brehl, "Banks issue cash-card pledge," The Toronto Star, Thursday, Oct. 9, 1997, 1 page.
Sanchez-Klein, "Electronic purse alliance planned," Computerworld, Jul. 29, 1998, printed Feb. 23, 2001, 2 pages.
Business Times, "Electronic purse can free you from ATM drag," printed Feb. 23, 2001, 1 page.
News Clippings, "'Electronic purse card' to be launched tomorrow," New Straits Times, Sep. 18, 1999, printed Feb. 23, 2001, 3 pages.
Rachel Konrad, Associated Press, IBM had a bunch of unusual ideas in 2003, printed from Philly.com on Jan. 21, 2004, posted on Tues., Jan. 13, 2004, 2 pages.
S. P. Miller et al., Section E.2.1: Kerberos Authentication and Authorization System, Project Athena, Cambridge, Massachusetts, Dec. 21, 1987, 39 pages.
Swift Gift 'Wows' Internet Shoppers, Wed., Dec. 2, 1998, PR Newswire, 2 pages (Author Unknown).
ECARD, Frequently asked questions, printed Feb. 23, 2001, 7 pages.
Machilis, Computerworld, "Have it the 'smart' way: Burger King program drives smart-card use,", printed Feb. 23, 2001, 1 page.
Press Release, Mar. 5, 2004, Payment data systems files patent on debit card payment solution, American City Business Journals, 1 page.
Press releases '99, "Proton world and Europay to co-operate in creation of new CEPS-compliant E-purse application," printed Feb. 23, 2001, Waterloo, Belgium, Jun. 28, 1999, 2 pages.
SCIA (Smart Card Industry Association), About Smart Cards, "Electronic Purse," printed Feb. 23, 2001, www.scia.org, 1 page.
Cordis, Pace IST-1999-11531 Pace, "Purse application for cross border use in euro," printed Feb. 23, 2001, www.cordis.lu, 3 pages.

SK100 Smart Card Electronic Purse Balance Reader, printed Feb. 23, 2001, 1 page.
Press Release, Apr. 21, 1997, Smart card for loyalty and e-purse applications eclipses capability of conventional mag-stripe cards, printed Feb. 23, 2001, 3 pages, www.1.slb.com.
SmartAxis, Load cash on to your e-purse card, Supported Currencies and Schemes, printed Feb. 23, 2001, www.smartaxis.co.uk, 9 pages.
"The Electronic Purse Reaches the Car Park", printed Feb. 23, 2001, 2 pages.
Stuber, Bank of Canada, "The electronic purse: An overview of recent developments and issues," Technical Report No. 74, Jan. 1996, printed Feb. 23, 2001, www.bankofcanada.ca, 2 pages.
ICL, Understanding the benefits, "Smartcity offers a number of important benefits to both the card issuers and the customers," printed Feb. 27, 2001, www.icl.com, 2 pages.
Visa first to launch electronic purse load via GSM mobile phone, Johannesburg, Apr. 7, 1999, printed Feb. 23, 2001, www.cellular.co, 4 pages.
Hansell, New York Times, "Visa to unveil electronic purse cards," printed Feb. 23, 2001, 2 pages.
Machlis et al., "Will smart cards replace ATMs?," Computerworld, printed Feb. 23, 2001, 3 pages.
Hotchkiss, D. Anne, "ATM's at the head of their class," Bank Marketing, vol. 29, No. 3, pp. 26-32, Mar. 1997.
International Search Report dated Mar. 9, 2005.
5500 - FDIC General Counsel's Opinion No. 8 - Stored Value Cards, 61 Fed. Reg. 40490, http://www.fdic.gov/regulations/laws/rules/5500-500.html, Aug. 2, 1006.
Edwards, ATMs The Hot New Media Buy, ABA Banking Journal, 03/1999, pp. 58, 60.
Neumann, An Enhanced Neural Network Technique for Software Risk Analysis, IEEE Transactions on Software Engineering, vol. 28, No. 9 Sep. 1, 2002, pp. 904-912.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check, Charge--What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, 12/1998..
Guidotti, Comparing Environmental risks: A Consultative Approach to Setting Priorities at the Community Level, Public Health Rev 1994, vol. 22, Jun. 16, 2005, pp. 321-337.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying By Credit Card-Real World and Online, http://www.virtualschool.edu/mon/ElectronicProperty/kiamond/credit, printed Jul. 8, 2005, 17 pages.
E-Z Pass, Web page, http://www.ezpass.com-DiscportNew York.html, Nov. 12, 2001.
E-Z Pass, Web page, http://www.ezpass.com-Disc_ny_annual.html, Nov. 12, 2001.
E-Z Pass, Web page, http://www.ezpass.com-frameMain.html, Nov. 12, 2001.
E-Z Pass, Web page, http://www.ezpass.com-whatis.html, Nov. 12, 2001.
First Data markets stored-value cards, Cards International, Jan. 30, 1996, p. 5.
First USA - Activate Today and Get One Hour Free Calling Card Calls, Call 1-800-555-2535, First USA, 6 pages.

Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.

Incentive Firms Find Debit Cards A Rewarding Experience (Off-line debit card issuers converge efforts with companies looking for effective incentives to boost employee productivity and to motivate individuals to buy their products), Debit Card News, vol.

Key Bank Holiday Offer, http://www.key.com/swiftgift/home.html, printed Apr. 5, 1999.

MailFrontier Survey Finds that Consumers Hold Financial Institutions Accountable for Online Identity Theft, www.mailfrontier.com, Palo Alto, CA 11/2004.

Clark, Microsoft, Visa to Jointly Develop PC Electronic-Shopping Software, The Wall Street Journal, Nov. 9, 1994, Nov. 9, 1994 WSJB9.

Bogle, Mutual Funds at the Millennium: Fund Directors and Fund Myths, The Vanguard Group to the '40 Act Institute of PLI (Practicing Law Institute), New York, NY, May 15, 2000, 15 pages.

New 1-800-CALL-ATT Campaign Promotes One Number for All Calls, AT&T Marketing, News Release, www.att.com/press/0297/970217.csa.htm, Feb. 17, 1997, 2 pages.

Stoughton, The Gift of Credit, www.washingtonpost.com/wp-srv/business, Dec. 14, 1998.

Langheinrich et al., Unintrusive Customization Techniques for Web Advertising, Computer Networks, vol. 31, 1999, pp. 1259-1272.

Visa Cash - Where can I get it?, www.visa-asia.com/pd/cash/where.html, Feb. 23, 2001.

Visa Cash, www.visa-asia.com/pd/cash/main.html, Feb. 23, 2001.

Visa International And SERMEPA Announce Plans For Cross Border Visa Cash Based On CEPS, www.visa.com/av/news/praaamisc111699.vhtml, Nov. 16, 1999.

Visa releases visa cash electronic pursue specifications based on CEPS, www.visa.com/av/news/PRaamisc042099.vhtml, San Francisco, Apr. 20, 1999.

Meridian Award Cards, JAB251.

Meridian - the leader in card marketing, JA8343.

Incenticard, JA8329.

Card Based Award Systems, JA8309.

Meridicard vs. Debit Cards, JA7917.

Award Card Comparision, JA7922.

How is it Different?, JA8331.

* cited by examiner

SPONSOR FUNDED STORED VALUE CARD

RELATED APPLICATIONS

This application is a Continuation of U.S. patent application Ser. No. 09/500,690 filed Feb. 9, 2000 now U.S. Pat. No. 6,615,190, entitled "SPONSOR FUNDED STORED VALUE CARD," the contents of which are incorporated herein in their entirety to the extent that it is consistent with this invention and application.

FIELD OF THE INVENTION

This invention relates to methods and systems for issuing stored value cards, and more particularly to stored value cards which are funded by a particular sponsor.

BACKGROUND OF THE INVENTION

On many occasions, companies must issue checks to people for payment of wages, claims, refunds, reimbursement of expenses, or other reasons. For example, a company may have to issue a check every Friday to pay employees for the previous weeks work. In another example, insurance companies have to issue checks to pay insurance claims. Issuing checks may be costly, as the processing costs associated with issuance, reconciliation, and/or replacement of lost or damaged checks may be substantial.

Checks may also have the drawback of being inconvenient to the recipient. Many banks require a checkholder to have an account with the bank to cash a check. Often, bank accounts charge monthly service fees, and/or charge based on the number of transactions (checks written, electronic debits, deposits, etc.) made in a predetermined time period. For non-account holders, checks must be cashed at the bank from where the check was drawn, or a fee is charged to cash the check. These fees may be five percent of the total amount of the check or more, thereby reducing the amount the recipient actually receives.

These and other drawbacks exist to the aforementioned alternatives.

SUMMARY OF THE INVENTION

An object of the invention is to overcome these and other drawbacks in existing purchase schemes.

A further object of the invention is to provide a stored value card which can replace the need to issue checks.

A further object of the invention is to provide a stored value card which allows immediate access to funds without requiring cash or access to a personal checking account.

A further object of the invention is to provide a stored value card with an associated sponsor funded stored value account (or "account" or "stored value account"), where a sponsor may add funds to the account, but a cardholder cannot add funds to the account.

These and other objects of the invention are accomplished according to various embodiments of the invention. One embodiment of the invention provides a method of issuing a stored value card affiliated with a sponsor and an issuer, where the stored value card is funded by a sponsor and issued to a cardholder. An account associated with the stored value card is created, where the sponsor funds the account. The stored value card is issued to the cardholder, where the cardholder is prohibited from depositing funds into the account.

Another embodiment of the invention provides a system for issuing a stored value card affiliated with a sponsor and an issuer, where the stored value card is funded is funded by the sponsor and issued to a cardholder. The system may comprise a processor for creating an account in a database. A sponsor input/output may receive instructions for the processor to fund the account. An issuing device may issue the stored value card to the cardholder.

Other objects and advantages exist for the present invention.

DETAILED DESCRIPTION OF THE PREFERRED EMBODIMENTS

The present invention is described in relation to a sponsor funded stored value card issued to a cardholder. In this environment, the present invention provides a stored value card account that is funded by a sponsor and issued to a cardholder. The cardholder may withdraw funds and receive information about the account, but may not deposit funds into the account. Nonetheless, the characteristics and parameters of the stored value card are equally applicable to other cards and card accounts.

For purposes of explaining the present invention, an embodiment of the present invention is set forth. A stored value card may be used by a sponsor to replace payroll checks issue to a sponsor's employees. A stored value card of the present invention may be issued to each employee by an issuer, such as a bank or other financial institution, on behalf of the sponsor. Each stored value card may have an account associated with the card.

The sponsor may fund the account associated with the stored value card at periodic intervals corresponding to the employee's payday (e.g., every Friday, every other Friday, the last day of the month, etc.) by instructing the issuer to fund the stored value card account. Employees may withdraw the funds at the employee's discretion, through known manners of withdrawal, e.g., automatic teller machines (ATM), point-of-service (POS) purchases, transfers to other accounts, etc. An employee may obtain the balance of the stored value card account, but may not deposit funds into the account. The present invention will now be described in more detail.

According to an embodiment of the invention, a sponsor funded stored value card has an account associated with the card. A sponsor funds an account, and may access other information associated with the account, such as the balance of the account and the transactions that have occurred in connection with the account. A cardholder may withdraw funds from the account, and may access other information associated with the account, including the balance in the account and various transactions that have occurred with the account.

Figure 1:
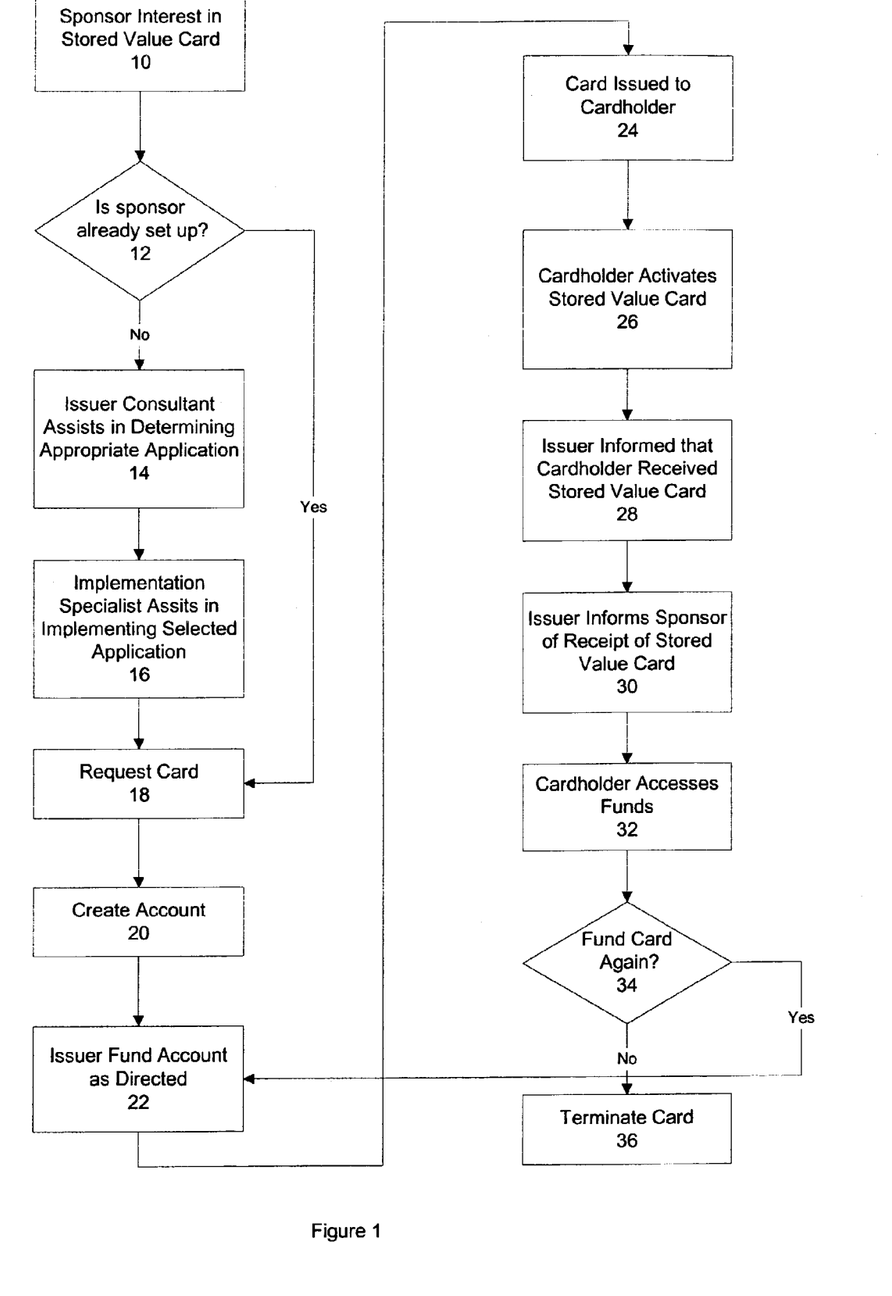
FIG. 1 shows a flowchart for requesting and issuing a stored value card of an embodiment of the invention.

FIG. 1 illustrates a flow chart for issuing a sponsor funded stored value card according to an embodiment of the invention. According to an embodiment, a sponsor may become interested in issuing a stored value card at step 10. Interest may be generated by advertising, such as radio and television commercials, internet advertisements, or direct mailing solicitation, such as through regular mail or through e-mail.

Interest may also be generated through previous relationship with an issuer, such as having previously issued a stored value card, or participated in other programs offered by the issuer. Other methods for interesting potential sponsors may also be used.

An issuer may determine if a sponsor has previously set up an appropriate program to allow issuance of a sponsor funded stored value card at step 12. If a sponsor has previously implemented a sponsor funded stored value card application or applications, a sponsor may request a sponsor funded stored value card at step 18. If a sponsor has not previously funded a sponsor funded stored value card, an issuer consultant may assist in determining the appropriate sponsor funded stored value card application at step 14. Various applications may include a sponsor funded stored value card for expense accounts, payroll accounts, or other applications. Examples of other applications will be described in greater detail below.

An implementation specialist may assist in implementing a selected application or applications at step 16. Implementation of a selected application or applications may include ensuring that applicable government regulations are properly followed, providing interface access between the appropriate mechanisms of a sponsor and the appropriate mechanisms of the issuer, and ensuring that a sponsor has the appropriate hardware and software to enable interaction with an issuer. Other implementation may also be required.

A sponsor company may request that a sponsor funded stored value card be created at step 18. A request may be a written request, such as through sending a letter or by completing a written form, an oral request, such as by a telephone call or by an in-person request, or by an electronic request, such as by e-mail or through a web-site request. According to an embodiment of the invention, security procedures may be used to ensure that sponsor funded stored value cards are properly requested. Other methods for requesting creation of a sponsor funded stored value card may also be used.

An issuer creates an account associated with a sponsor funded stored value card at step 20. The account associated with a sponsor funded stored value card holds the funds designated by the sponsor. A sponsor may add funds at step 22. According to an embodiment of the invention, a sponsor may add funds to the account as desired, such as by transferring funds from another account, while a cardholder may not add to the account.

A sponsor fund stored value card may be issued to a cardholder at step 24. Issuing a stored value card may be performed in a number of known manners. These manners include mailing a stored value card to a cardholder, or presenting a stored value card to the cardholder in person, such as at the financial institution or at the sponsor's place of business. According to an embodiment of the invention, a card issuing mechanism may be available to issue a stored value card as directed. Other methods for issuing stored value cards may also be used.

A stored value card may be given a unique account number which may be embossed on the front of the card along with a card-holder's name. A stored value card may also be affiliated with a credit network (e.g. VISA™, MasterCard, etc.). An identification indicia of the credit network may be displayed on the front of the stored value card, as well as an identification indicia of an issuer and/or sponsor.

A cardholder may activate a stored value card at step 26. According to an embodiment of the invention, a cardholder may activate a stored value card by communicating with an issuer, such as by telephone, internet connection, or other method of communication. According to an embodiment of the invention, a cardholder may activate a stored value card at an ATM terminal. Other methods of activating a stored value card may also be used.

At step 28, an issuer may be informed that a cardholder has received a stored value card. According to an embodiment of the invention, a cardholder may inform an issuer of receipt of a stored value card simultaneously with activating a stored value card. Other methods of informing an issuer of receipt of a stored value card may also be used.

An issuer may inform a sponsor that a stored value card has been received by a cardholder at step 30. Informing a sponsor may occur in writing, or an electronic medium, such as e-mail or the internet. Other methods of informing sponsors may also be used.

A cardholder may access funds at step 32. Accessing funds may include withdrawing funds as cash at an ATM terminal, making a POS purchase at a merchant transferring the funds to another account, or withdrawing fluids at a financial institution. Other methods of accessing funds may also be used.

Figure 2:
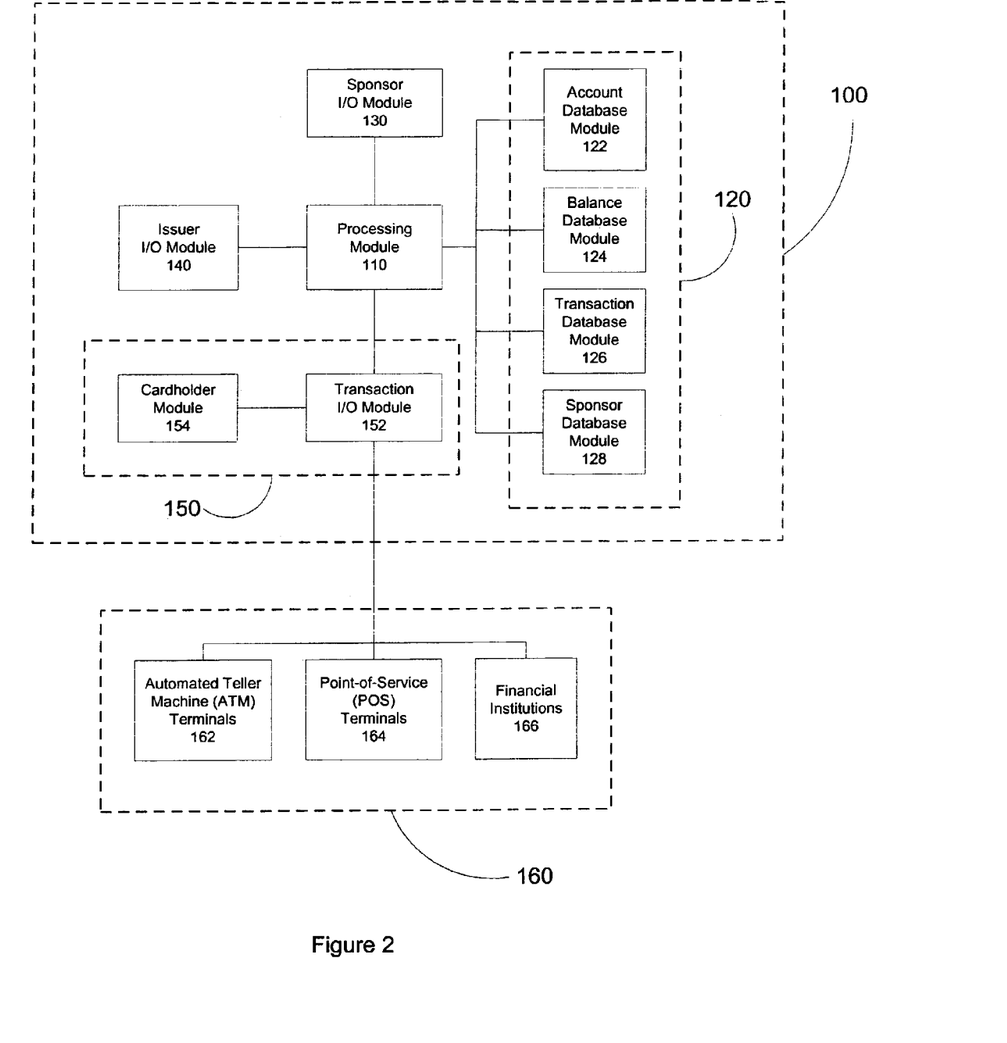
FIG. 2 illustrates a schematic of an embodiment of a system to be used with a stored value card.

At a predetermined time, a sponsor may determine whether to add additional funds to a sponsor funded stored value card at step 34. Funds may be added periodically, such as in the case of payroll payments, or may be added sporadically, such as in the case of expense payments. A sponsor may direct an issuer to fund an account as directed at step 22. According to an embodiment of the invention, a sponsor may send a transmission, such as a file to a processing module 110, to the issuer identifying the amount of funds to be deposited into a stored value account. A sponsor may then send funds (e.g. send a check, wire funds, etc.) to the issuer for deposit in the specific stored value account. According to another embodiment of the invention, one transmission may be sent to an issuer to deposit funds in a stored value card account. A transmission, such as a transmission made through the Automated Clearing House ("ACH") used by financial institutions, may contain a routing number and transit number for an issuer and a stored value account number. By way of example, a transmission comprises a routing number and transit number for the issuer, and a stored value account number. The transmission is sent through the ACH. The transmission is rejected, as it is not a demand deposit account number, and is sent to system 100, such as to processing module 110. Based on the transmission, system 100 credits the appropriate stored value account with the appropriate amount of funds. If no funding of the stored value card is to take place, the store value card may be terminated at step 36.

FIG. 2 illustrates a schematic system to support a sponsor funded stored value card according to an embodiment of the invention. System 100 comprises a processing module 110, a database module 120, a sponsor input/output (I/O) module 130, an issuer I/O module 140, and a cardholder transaction module 150.

According to an embodiment of the invention, processing module 110 may act to coordinate information flow in system 100 and, according to an embodiment of the invention, may be a central processing unit (CPU) of a computer. According to an embodiment of the invention, database module 120 may comprise an account database module 122, a balance database module 124, a transaction database module 126, and a sponsor database module 128. An account database module 122 may be responsible for storing information related to accounts associated with each stored purchase card, such as an account number and a stored value card number. Other information may also be stored in an account database module 122.

Balance database module 124 may be responsible for storing information about the account balance. Processing module 110 may instruct balance database module 124 to be updated to increase or decrease the amount of funds in a stored value card account. Funds may be increased if a sponsor seeks to deposit funds into an account. Funds may be decreased if a sponsor removes funds, or if a cardholder withdraws funds. Other information may also be stored in balance database module 124.

Transaction database module 126 may be responsible for storing information related to stored value card accounts and stored value card transactions. According to an embodiment of the invention, transaction account module 126 may maintain records of every deposit and withdrawal associated with a stored value card account. A list of the transactions may be available to a sponsor, and/or to a cardholder. A list of transactions may be available in a hard copy, e.g., a printout, or in a softcopy, e.g., an electronic medium such as a spreadsheet file. Other information may also be stored in transaction database module 126.

Sponsor database module 128 may be responsible for storing information about various sponsors, including the number of stored value cards funded by a sponsor, the status of the stored value cards, and the status of the sponsor. According to an embodiment of the invention, a sponsor database module 128 may maintain records of information about each sponsor, the stored value cards associated with each sponsor, and any instructions associated with each sponsor. Other information may also be stored in sponsor database module 128.

Sponsor Input/Output (I/O) module 130 may permit a sponsor to connect with processing module 110, and transmit and receive information. According to an embodiment of the invention, a sponsor may use sponsor I/O module 130 to request information about one or more stored value card accounts. Processing module 110 may access account database module 122, retrieve the requested information, and transmit the information to a sponsor via sponsor I/O module 130. A sponsor may also transmit a request for a new stored value card via sponsor I/O module 130. Other information may also be transmitted and/or requested. Sponsor I/O module 130 may be a direct network connection, such as a dedicated line between a sponsor and an issuer, or an indirect connection such as through the internet (world wide web) and a browser. Other methods of connection may also be used.

Issuer I/O module 140 may permit an issuer to connect with processing module 110, and transmit and receive information. According to an embodiment of the invention, an issuer may use issuer I/O module 140 to direct processing module 110 to create accounts, add funds, and retrieve various requested information, such as account balances, transactions, and the status of a stored value card. Other information may also be transmitted and retrieved by issuer I/O module 140.

Cardholder transaction module 150 may permit a cardholder to access funds from a stored value card account. According to an embodiment of the invention, cardholder transaction module 150 may comprise a transaction I/O module 152 and a cardholder I/O module 154. Transaction I/O module 152 may be connected to a financial network 160, which may include ATM terminals 162, POS terminals 164, and financial institutions 166. A cardholder may use ATM terminals 162 to make cash withdrawals from the stored value card. According to an embodiment of the invention, a cardholder may use ATM terminals 162 to check the balance of the stored value card account. Cardholders may make purchases at merchants with POS terminals 164, as with a credit card or debit card. A cardholder may withdraw funds at a financial institution 164, such as a bank, from a stored value card by withdrawing funds in the form of cash, or transferring funds to an account in the financial institution. Other methods of performing cardholder transactions may also be used.

According to an embodiment of the invention, a cardholder may be able to access funds via a cardholder I/O module 154. A cardholder I/O module 154 may connect to transaction I/O module 152, enabling a cardholder access to a stored value card account. A cardholder I/O module 154 may be a browser which connects to transaction I/O module 152 via the internet. Cardholder I/O module 154 may also comprise a connection by telephone, e-mail or other methods of connection to transaction I/O module 152. According to an embodiment of the invention, a cardholder may check the balance of the stored value card account, may make purchases, such as through electronic commerce or other commerce using the stored value account, or may transfer funds from the stored value card account to another account. As with the stored value card, a cardholder may be unable to deposit funds into the account via cardholder I/O module 154. Other access by cardholder I/O module 160 may also occur.

As noted previously, a sponsor funded stored value card may provide for partnering an issuer with a company desiring to streamline payment processing using a prefunded stored value card. According to an embodiment of the invention, a stored value card may look like a credit card to an ordinary observer, but with no credit line, and may function like a debit card, but with no associated cardholder deposit account. Such a stored value card issued by a sponsoring entity may reduce handling costs of checks and paper processing for both an issuer and a recipient.

For an issuer, a stored value card may provide revenue through transaction fees paid by merchants and cardholders, as well as the revenue generated from the "float" of funds held by an issuer on behalf of a sponsor company and cardholder. According to an embodiment of the invention, interest may be earned on the balance of funds in a stored value card account. Interest may be awarded to a sponsor of the stored value card, or may be awarded to a cardholder. For a sponsor, processing costs associated with issuance, reconciliation, and replacement of lost or damaged checks may be greatly reduced or eliminated. For applications involving relocation and business expenses and the like for employees or contractors, a stored value card may provide sponsors a convenient method for monitoring expenses. For the cardholder, a stored value card may provide immediate access to funds without the need to manage and safeguard a large sum of cash. A stored value card may also obviate the need for a cardholder to write multiple checks and perform reconciliation of a personal checking account. For cardholders not having a checking account, a stored value card may save the cost of check cashing fees, which can be up to five percent or more.

Sponsor funded stored value accounts may be used to support a variety of applications, including: (1) payroll applications; (2) business expense reimbursement and prepaid business expense applications; (3) relocation applications; (4) private label applications; (5) government benefit applications; (6) insurance applications; (7) consumer promotion applications; and (8) incentive/reward applications.

According to an embodiment of the invention, a (1) payroll program application may allow a company to issue employees a stored value card associated with a payroll, where a stored value card can be periodically funded (e.g., each payday).

According to an embodiment of the invention, a (2) business expense reimbursement and prepaid business expense application allows a company to reimburse an employee for actual expenses. A sponsor company may also prepay an employee for expected expenses by providing a funded stored value card. Similarly, a (3) relocation program application may allow a sponsor company to reimburse actual expenses by issuing a sponsor funded stored value card, or to prepay expected expenses associated with employee relocation with a sponsor funded stored value card.

A (4) private label application may allow companies to provide employees and customers with a card used only for purchases of products and services at a specified merchant. According to an embodiment of the invention, a sponsor may limit where a stored value card may be used. By way of example only, a sponsor company involved in construction may provide employees with a sponsor funded stored value card that may only be used at hardware stores and lumberyards.

A (5) government benefits application may allow government entities to distribute benefits, refunds and government-sponsored loans using the card. According to an embodiment of the invention, a person receiving social security benefits may be issued a stored value card sponsored by the U.S. government. The stored value card may be funded monthly with a predetermined amount of the benefit to be received. The beneficiary cardholder may withdraw funds using the stored value card. Other government benefits may also be used.

An (6) insurance program may permit an insurance company to pay claimants and beneficiaries through a stored value card instead of a conventional check. In this application, a card may be funded one time or periodically, depending on the insurance agreement and circumstances of the claim.

According to an embodiment of the invention, a (7) consumer promotion programs application may allow companies to enhance customer loyalty or attract new customers by providing a prepaid stored value card. By way of example only, a stored value card may be sent to a cardholder as a coupon to entice purchase of selected merchandise, or as a rebate for a previous purchase of selected merchandise.

A (8) incentive/reward application may allow a company to reward employees, agents and customers for their sales/service performance or consumer behavior. A stored value card may be funded with incentives, rewards and commissions on a one-time or continual basis. By way of example only, a sponsor company may issue and fund a stored value card to a salesperson who reaches certain sales goals.

Combinations of various applications may also be applied to a sponsor funded stored value card. By way of example, a sponsor company which sells gasoline may provide customers that meet certain predetermined criteria (e.g., have purchased twelve tanks of gasoline) a sponsor funded stored value card which may be used to purchase items, such as gasoline or oil, at the sponsor company, or affiliated stores. By way of another example, a government entity may pay tax refunds by issuing a stored value card. Other applications may also be available for a stored value card of the present invention.

According to another embodiment of the invention, a computer usable medium having computer readable program code embodied therein for a sponsor funded stored value card may be provided. For example, the computer usable medium may comprise a CD ROM, a floppy disk, a hard disk, or any other computer usable medium. One or more of the modules of system 100 may comprise computer readable program code that is provided on the computer usable mediums such that when the computer usable medium is installed on a computer system, those modules cause the system to perform the functions described.

According to an embodiment of the invention, processing module 110, database module 120, account database module 122, balance database module 124, transaction database module 126, sponsor database module 128, sponsor I/O module 130, issuer I/O module 140, cardholder transaction module 150, transaction I/O module 152, and cardholder I/O module 154 may comprise computer readable code that, when installed on a computer, perform the functions described below. Also, only some of the modules may be provided in computer readable code.

According to a specific embodiment of the present invention, system 100 may comprise components of a software system. System 100 may operate on a network and be connected to other systems sharing a common database or databases. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A method for issuing a stored value card affiliated with a predetermined credit network, an organization sponsor, and an issuer, wherein the credit network, the issuer, and the organization sponsor each have separate identification indicia, the method comprising:

creating one account associated with the stored value card, wherein the organization sponsor funds the account and the account is independent and unassociated with any other account; and issuing the stored value card to a cardholder, wherein:

a) the issued stored value card is marked with the cardholder's name and at least one of the credit network identification indicia, the issuer identification indicia, and the organization sponsor identification indicia;

b) the stored value card is accepted wherever cards associated with the predetermined credit network are accepted; and c) the stored value card uses a one-way only transfer of identification information from the stored value card to the predetermined credit network.

2. The method according to claim 1, wherein the cardholder activates the stored value card.

3. The method according to claim 1, wherein the sponsor funds the account on a periodic basis.

4. The method according to claim 1, wherein the organization sponsor funds the card more than once.

5. The method according to claim 1, wherein the organization sponsor receives records regarding account transactions.

6. The method according to claim 1, further comprising the step of notifying the issuer that the cardholder has received the stored value card.

7. The method according to claim 6, further comprising the step of the issuer notifying the organizational sponsor that the stored value card has been received by the cardholder.

8. The method according to claim 1, wherein the issuer and the organization sponsor are the same entity.

9. The method according to claim 2, wherein the stored value card is active for a predetermined period of time.

10. The method according to claim 1, further comprising the step of designating merchants where the stored value card may be used, wherein:
 a) the designated merchants are related to the business of the organization sponsor; and
 b) the designated merchants accept cards associated with the credit network.

11. The method according to claim 1, where the organization sponsor is a business.

12. A system for issuing a stored value card affiliated with a predetermined credit network, an organization sponsor and an issuer, wherein the credit network, and the issuer, and the sponsor each have separate identification indicia, the system comprising:
 means for creating one account associated with the stored value card, wherein the organization sponsor funds the account and the account is independent and unassociated with any other account; and
 means for issuing the stored value card to a cardholder, wherein:
 a) the issued stored value card is marked with the cardholder's name and at least one of the credit network identification indicia, the issuer identification indicia and the organization sponsor identification indicia;
 b) the stored value card is accepted wherever cards associated with the predetermined credit network are accepted; and
 c) the stored value card uses a one-way only transfer of identification information from the stored value card to the predetermined credit network.

13. The system according to claim 12, wherein the cardholder activates the stored value card.

14. The system according to claim 12, wherein the sponsor funds the account on a periodic basis.

15. The system according to claim 12, wherein the organization sponsor funds the card more than once.

16. The system according to claim 12, further comprising means for recording account activity.

17. The system according to claim 12, further comprising means for notifying the issuer that the cardholder has received the stored value card.

18. The system according to claim 17, further comprising means for the issuer to notify the organization sponsor that the stored value card has been received by the cardholder.

19. The system according to claim 12, wherein the issuer and the organization sponsor are the same entity.

20. The system according to claim 13, wherein the stored value card is active for a predetermined period of time.

21. The system according to claim 12, further comprising means for designating merchants where the stored value card may be used, wherein:
 a) the designated merchants are related to the business of the organization sponsor; and
 b) the designated merchants accept cards associated with the credit network.

22. The system according to claim 12, wherein the organization sponsor is a business.

23. A method for issuing a stored value card affiliated with a predetermined credit network, an employer, and an issuer, wherein the credit network, the issuer, and the employer each have separate identification indicia, the method comprising:
 creating one account associated with the stored value card, wherein the employer funds the account on a periodic basis corresponding to the employer's payroll cycle, and the account is independent and unassociated with any other account; and
 issuing the stored value card to an employee, wherein:
 a) the employer is unable to access transactions associated with the stored value card;
 b) the stored value card is marked with the employee's name and at least one of the credit network identification indicia, the issuer identification indicia, and the employer's identification indicia;
 c) the stored value card is accepted wherever cards associated with the predetermined credit network are accepted; and
 d) the stored value card uses a one-way only transfer of identification information from the stored value card to the predetermined credit network.

24. The method according to claim 23, wherein the employee activates the stored value card.

25. The method according to claim 23, further comprising the step of notifying the issuer that the employee has received the stored value card.

26. The method according to claim 25, further comprising the step of the issuer notifying the employer that the stored value card has been received by the employee.

27. The method according to claim 23, wherein the issuer and the employer are the same entity.

28. The method according to claim 24, wherein the stored value card is active for as long as the employee remains employed by the employer.

29. A system for issuing a stored value card affiliated with a predetermined credit network, an employer and an issuer, wherein the credit network, and the issuer, and the employer each have separate identification indicia, the system comprising:
 means for creating one account associated with the stored value card, wherein the employer funds the account on a periodic basis corresponding to the employer's payroll cycle, and the account is independent and unassociated with any other account; and
 means for issuing the stored value card to an employee, wherein:
 a) the employer is unable to access transactions associated with the stored value card;
 b) the stored value card is marked with the employee's name and at least one of the credit network identification indicia, the issuer identification indicia and the employer's identification indicia;
 c) the stored value card is accepted wherever cards associated with the predetermined credit network are accepted; and
 d) the stored value card uses a one-way only transfer of identification information from the stored value card to the predetermined credit network.

30. The system according to claim 29, wherein the cardholder activates the stored value card.

31. The system according to claim 29, further comprising means for notifying the issuer that the cardholder has received the stored value card.

32. The system according to claim 31, further comprising means for the issuer to notify the sponsor that the stored value card has been received by the cardholder.

33. The system according to claim 29, wherein the issuer and the sponsor are the same entity.

34. The system according to claim 29, wherein the stored value card is active for a predetermined period of time.

35. A method for issuing a stored value card affiliated with a predetermined credit network, an employer, and an issuer, the method comprising:
   creating one account associated with the stored value card, wherein the employer funds the account on a periodic basis, and the account is independent and unassociated with any other account; and
   issuing the stored value card to an employee, wherein:
   a) the employer is unable to access transactions associated with the stored value card;
   b) the stored value card is accepted wherever cards associated with the predetermined credit network are accepted;
   c) the employee activates the stored value card; and
   d) the stored value card uses a one-way only transfer of identification information from the stored value card to the predetermined credit network.

36. The method according to claim 35, further comprising the step of notifying the issuer that the employee has received the stored value card.

37. The method according to claim 36, further comprising the step of the issuer notifying the employer that the stored value card has been received by the employee.

38. A system for issuing a stored value card affiliated with a predetermined credit network, an employer and an issuer, the system comprising:
   means for creating one account associated with the stored value card, wherein the employer funds the account on a periodic basis, and the account is independent and unassociated with any other account; and
   means for issuing the stored value card to an employee, wherein:
   a) the employer is unable to access transactions associated with the stored value card;
   b) the stored value card is accepted wherever cards associated with the predetermined credit network are accepted;
   c) the employee activates the stored value card; and
   d) the stored value card uses a one-way only transfer of identification information from the stored value card to the predetermined credit network.

39. The system according to claim 38, further comprising means for notifying the issuer that the employee has received the stored value card.

40. The system according to claim 39, further comprising means for the issuer to notify the employer that the stored value card has been received by the employee.

* * * * *